May 22, 1962 R. W. DIERKS 3,036,287

CONTROL PANELS AND WIRING ACCESSORIES FOR ELECTRONIC DATA PROCESSING MACHINES

Filed Feb. 2, 1960 2 Sheets-Sheet 1

INVENTOR.
RAYMOND W. DIERKS
BY
Kegan, Bellamy & Kegan
ATTORNEYS

May 22, 1962 R. W. DIERKS 3,036,287

CONTROL PANELS AND WIRING ACCESSORIES FOR ELECTRONIC DATA PROCESSING MACHINES

Filed Feb. 2, 1960 2 Sheets-Sheet 2

INVENTOR.

RAYMOND W. DIERKS

BY

Kegan, Bellamy & Kegan

ATTORNEYS 3,036,287

CONTROL PANELS AND WIRING ACCESSORIES FOR ELECTRONIC DATA PROCESSING MACHINES

Raymond W. Dierks, East Aurora, N.Y., assignor to Graphic Controls Corporation, Buffalo, N.Y., a corporation of New York Filed Feb. 2, 1960, Ser. No. 6,137
6 Claims. (Cl. 339—113)

This invention relates to data processing machines and similar electrical or electronic machines and apparatus of a multi-unit-code electrical or electronic nature, including computing machines or the like, but is concerned more particularly with the wiring of control panels employed in machines and apparatus of the foregoing character.

The principal object of the invention is to provide, for the first time, a control panel or wiring accessories therefor, or both, which will permit a simple, straightforward, and logical wiring procedure to be followed at the noted control panels. An aspect of this principal object is that, considered in their entirety, the machines and structures referred to are capable of providing limitless variations which include permutations and combinations of code elements. Practical considerations, however, dictate that, for a given machine used in the overall computing or data processing operations, a control board (hereinafter sometimes termed control panel) must be used of some definite size and have some definite number of fixed jack points, wiring points, or crosspoints, through which all electrical pulses or signals employed in the operation of that machine must pass, and the persons who wire this control panel or change the wiring from time to time to accord with conditions met in actual practice have not yet been provided with control panel apparatus and accessories permitting them to proceed with simple grade-school logic to reduce the truly amazing complexity of the machine operations into a few logically arranged and connected pulse-carrying wires on the control panel of that machine.

Merely by way of example and by no means exhaustive of the available commercial-usage examples, computing and data-processing machines as indicated above have heretofore been manufactured, sold, and used as follows:

(1) Card punching machines whereat source data is converted into punched data cards;

(2) Duplicating machines which punch repetitive information from a master data card into a group of succeeding detail data cards;

(3) Card-verifying machines whereat a second operator verifies the original punching by depressing the keys of a verifier while reading from the same source data;

(4) Gang-punching machines which automatically copy punched information from a master card into one or more detail cards that follow it;

(5) Reproducing machines whereat information from one set of punched source cards is automatically punched into another set of cards;

(6) Mark-sensing punching machines which automatically punch a card by means of electrically conductive marks made on the card with a special pencil;

(7) Interpreting machines which translate punched holes into printed information on a card, alphabetic or numerical information being printed in many different positions on the same card from which it is read, when desired;

(8) End-printing machines which convert punched information into bold printing across the end of a card simultaneously with gang punching, summary punching, reproducing, and mark-sensed punching, being generally similar to interpreting machines;

(9) Ticket-converting machines for changing prepunched ticket stubs (such as 2.7" wide by 1" deep) into cards, the stub being detached from its ticket when a transaction occurs and put into a receiver which is placed directly into the ticket converter;

(10) Sorting machines which group punched or otherwise coded cards according to any classification punched in them;

(11) Selecting machines (including for example a Type 82 sorter, a Type 101 electronic statistical machine, and a Type 77 and 89 Collator) which physically pull from a mass file or library of punched cards all cards of a certain classification momentarily desired;

(12) Merging machines comprising a Type 77 and 89 Collator with its control panel especially wired to suitably and orderly merge the cards of two files, such as a primary file and a secondary file;

(13) Matching machines (comprising a Type 77 and 89 Collator with its control panel suitably wired differently from its wiring for either item 11 or item 12 above) to check the agreement between the cards in two sets or files and to select or separate from the files unmatched cards of either group, this function being frequently performed in conjunction with merging;

(14) Detail-printing machines (comprising for example a Type 402–403 accounting machine, or a Type 407 accounting machine, or both) which are used to prepare reports that show complete detail about each transaction, including the operations of adding, subtracting, cross-adding, or cross-subtracting, and the printing of many combinations of totals;

(15) Group-printing machines (which comprise one or both of the machines listed last above with their control panels suitably rewired) that summarize groups of cards and print the totals on a report, including the carrying of balances (of figures) forward including the previous total-to-date card with the current cards, and the like;

(16) Accumulated-total punching machines;

(17) Calculating machines for computing by multiplication, division, addition, or subtraction, or any combination of these calculations;

(18) Facsimile-posting machines through which, by a suitably wired control panel, number and/or alphabetic information may be transferred from a transaction-listing sheet and reproduced in facsimile form on a ledger sheet;

(19) Card-to-card transceiving machines employing code-punched tapes for inter-machine transmission over existing telegraph facilities or over voice telephone circuits which are also available for direct voice communication between operators at the respective distance-separated machines;

(20) Typewriter tape-punching machines such as a typewriter-controlled machine having a noted control panel through which is controlled the recording on 8-channel tape all information typed on the typewriter;

(21) Tape-reading machines to which the information typed on typewriter tape punching machines can be transmitted and at which the tape is read and converted into code information on punch cards;

(22) Statistical-work machines (an example of which is a Type 101 electronic statistical machine whose control board is wired to provide count, accumulate, balance, and edit sections) for handling data bits or units in many different classifications, to perform card sorting and arranging operations, and to produce accurately checked printed summaries;

(23) Data-processing machines into which are entered a complete set of instructions (as in punched-card form) together with initial-source data which enables the machine or machines to arrive at the completed final results or reports in one operation;

(24) In-line processing machines which may include a group of physically separated machines with their control panels suitably and specifically wired for the desired inter-machine action in posting transactions to all ledger accounts as the transactions occur; and

(25) Accessibility-and-interrogation machines employed in handling problems requiring large-capacity random-access storage, as in coded-disc form with the records in disc storage capable of being up-dated as the transactions occur and also making it possible to inquire about the status of any records in less than 2 seconds, data being enterable into the system from magnetic tapes, punch cards, manual inquiry stations, or information previously stored in magnetic discs, with the output results being printed, punched, or typed.

Any and all of the foregoing machines require a separate control panel which is logically wired for the particular use to which the machine is to be put at any one time and requiring specifically different wiring on the control panel for the same machine or any other specific use or time, whereby there is a clear necessity for a control panel or accessories therefor which will permit the changeable wiring of the control panel (on the exposed or exposible face thereof) to be applied, tested, or changed, in a simple, straightforward, and logical manner, to the end that the human factor of error in control-panel wiring be reduced to a minimum.

Additionally, it has heretofore been proposed that the wires employed on the face of a control panel of the character indicated above be color-coded to assist in reducing the factor of human error, but all such attempts have been unsatisfactory for one reason or another, one reason being that practical necessity has required that the removable or changeable wires be limited as to the number of wire lengths provided, which has resulted in the supposed benefits of color-coded wiring being largely lost because of a resultant jumble or tangle of wires. This tangled arrangement has necessitated that any one wishing to make a test of or to change a certain wire (or interconnected group of wires) from one terminal to another or to replace that wire, has had to dig among the tangle of wires to such an extent that he is not at all sure that he has truly effected the desired or intended disconnection, change, test, or replacement.

Moreover, attempts to relieve the foregoing situation by increasing the size of the control panel have met with only dubious success, if any, because of such factors as (1) the necessarily limited space within any individual machine for the required readily accessible location of the front face of the control panel and (2) the undesirability of increased weight of any individual machine, particularly a portable machine of the class comprising office or business machines.

According to the invention, the foregoing and other objects of the invention are attained by providing a new and improved control board, or by modifying existing control boards or types thereof, to incorporate the invention structure, which includes improved wiring terminals and wiring-terminal accessories, and improved detachable and replaceable color-coded wiring units as of the patch-cord multi-ended type, color-coded control-panel and data-card attachments, all of which act together to enable the control board wiring to be straightforward, untangled, and logical.

A feature of the invention is that a new and hitherto unknown use is made of solderless wrapped wire terminals, wherein quick-wrap and quick-unwrap facilities are provided for closely spaced control-panel terminals by available hand tools (power or manually operated) to the end that the down or non-working time of the individual machines is reduced from hours or minutes to seconds.

The above-mentioned and other objects and features of this invention, and the manner of obtaining them, will become more apparent, and the invention will be best understood by reference to the following description of the invention taken in conjunction with the accompanying drawings comprising FIGS. 1 to 14, wherein.

Figures 1, 2, 3, 4:
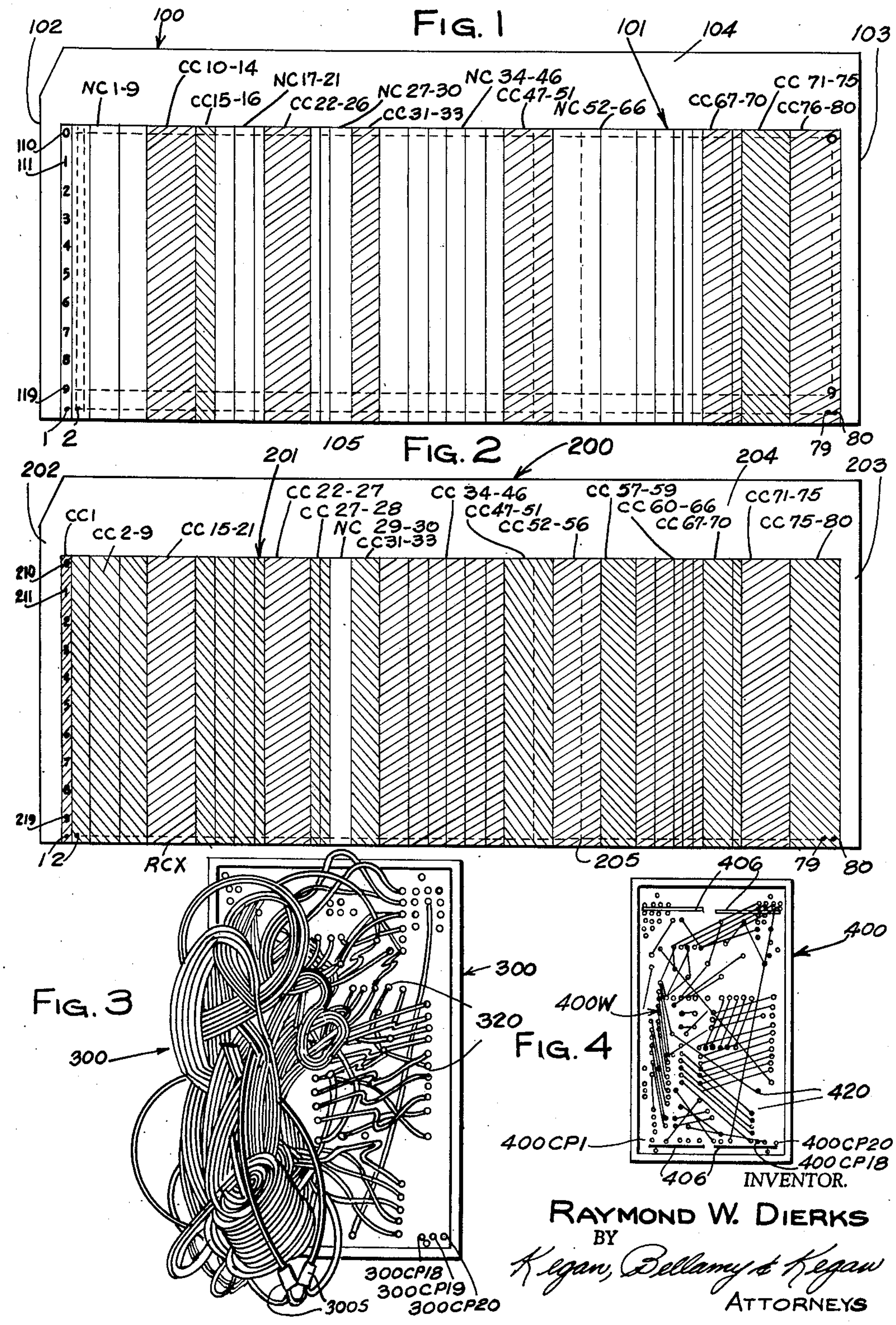
FIGS. 1 and 2 show unpunched color-coded data cards according to the invention.
FIG. 3 shows an existing form of the control panel as commonly wired before this invention.
FIG. 4 shows an equivalent control panel equipped, modified and wired according to this invention, wherein the same control panel of FIG. 3 may be used or a smaller-sized control panel may be used having a size reduction made practicable by this invention.
Figures 5, 6, 7, 8, 9, 10, 11, 12, 13, 14:
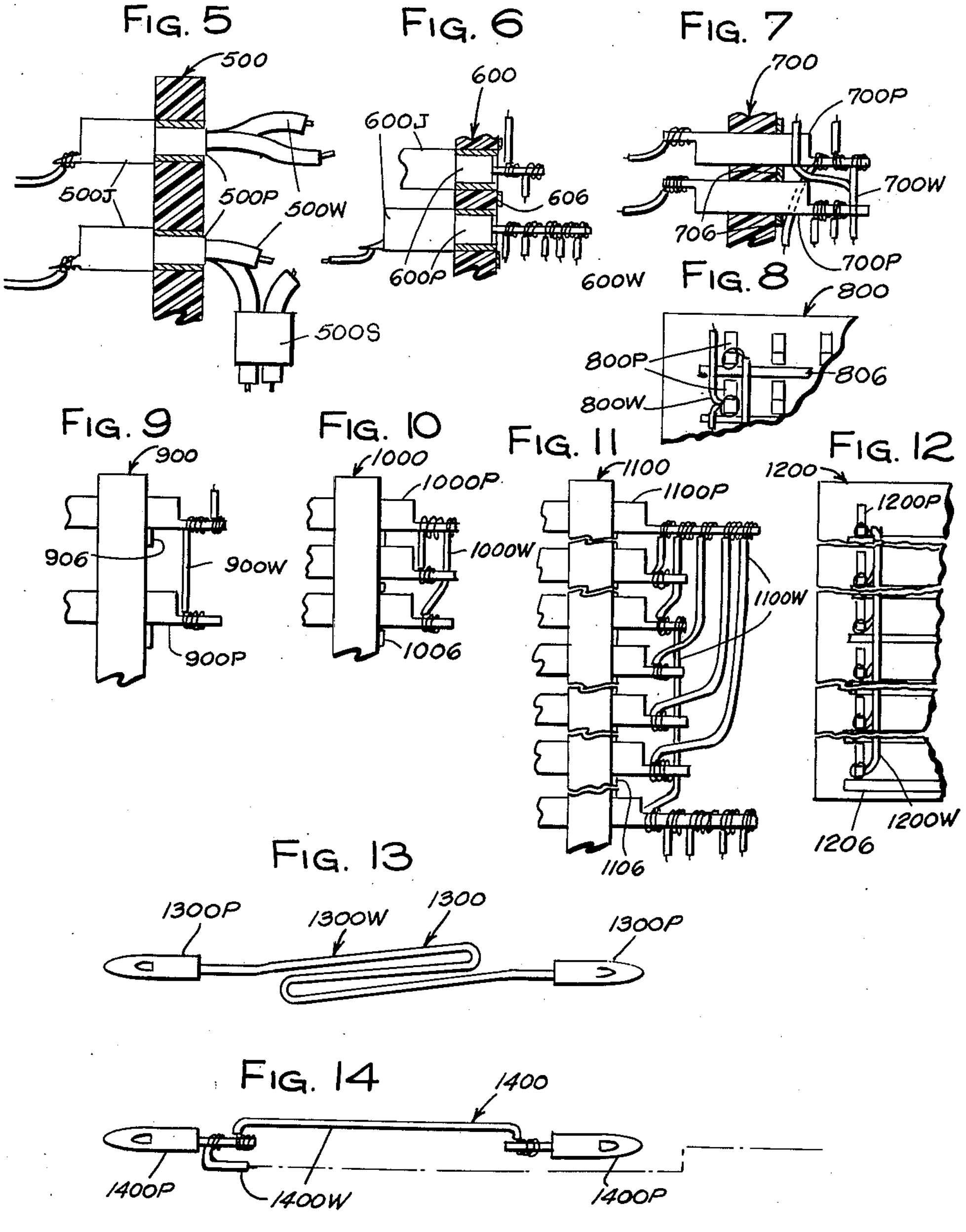
FIG. 5 is a partial edge view in section of the control panel of FIG. 3.
FIGS. 6 and 7 are partial edge sectional views of respective forms of the control panel of FIG. 4, with FIG. 8 being a corner-view illustration of a control panel according to FIG. 7.
FIGS. 9 and 10 are partial edge views of control panel constructions which may be, but not necessarily, the same basic control-panel construction of FIG. 6 or FIG. 7.
FIGS. 11 and 12 are partial views respectively of the left-hand edge and the left-hand front portion of a control panel according to the invention.

FIG. 13 shows a single-conductor commonly-turned or curled patch-cord wiring item used with existing control panels according to FIGS. 3 and 5; and FIG. 14 shows an equivalent straight-wire color-coded patch-cord wiring item according to the invention, and having facilities for on-the-job assembly and on-the-job addition of another conductor or conductors for the logical straight-wire wiring arrangement illustrated in one form in FIG. 4.

Reference is hereby made to a 31-page printed publication entitled, "IBM Data-Processing Machine Functions" with the notations © 1950, 1954, 1957 International Business Machines Corporation, New York; and Form 224-8208-3; and having inserted therein a loose sheet on which there are three illustrations labelled: "FIGURE 113. Control Panel"; "FIGURE 114. Circuit Completed by Control Panel Wiring" (illustrating an individual 6-element code); and "FIGURE 115. Control Panel Completing a Machine Circuit" (the showing being of a fragment of control-panel structure in edge cross section).

The items 1 to 25 hereinbefore tabulated may be considered as having been extracted from pages 5 to 31 of the foregoing publication, preceded or supplemented by issued patents and other pertinent publications and information.

Reference is also hereby made to publications "Monograph 2323" and "Monograph 2085," being entitled "Bell Telephone System Technical Publications," one containing an indication of having appeared in "vol. 33, pp. 1093-1110, September 1954," reciting "copyright, 1954," and the other reciting "vol. 32, pp. 523-591, May 1953," "copyright 1953." Certain printed copies of said publications have been stamped "Compliments of Gardner Denver Co., manufacturers of Air and Electric Wire-Wrap ® Tools."

*Detailed Description*

The solderless wrapped connections referred to herein are capable of being made by portable or hand tools developed or supplied, for example, by a manufacturer hereinbefore referred to. Such a tool can tightly and satisfactorily make a wrapped solderless connection around the terminal of a group of wire wrapping terminals spaced as close together (at least in one direction) as about two and a half times the wrapping post pertaining dimension (width or thickness) of 3/64 (.047) inch, which provides a basic center-to-center terminal-member dimension of 1/8 (.125) inch. It is thereby currently feasible to greatly reduce the present vertical terminal-blade spacing dimension from about 1/4 inch (.250) to about 5/32 inch (.157), center-to-center and to still more greatly reduce the present horizontal spacing from about ¼ inch (.250) to about ⅛ (.125) center-to-center.

The tangled wiring shown in FIG. 3 may be considered as indicative either of the non-coded or of ineffective color-coded wiring heretofore commonly employed on the front of the herein control panel, and the wiring devices shown in FIGS. 5 and 13 are illustrative of the wiring devices applied to the front of the herein defined control panels prior to this invention.

FIGS. 1, 2, 6 to 12, and 14 illustrate embodiments of this invention, with FIGS. 3, 5, and 13 being also employed for illustrative purposes.

Items 100 and 200 of FIGS. 1 and 2, when supplied with color coding as indicated by NC1–9 to CC76–80 in FIG. 1 and by CC1 to CC75–80 in FIG. 2, comprise known standard data cards color-coded according to the invention. Each of these cards has 80 columns of figures or digit symbols 0 to 9 printed therein as shown for the first group of columns 110 to 119 in FIG. 1 and for the first group of columns 210 to 219 in FIG. 2. A horizontal row of tiny column numbers 1 to 80 extends underneath the columns near the bottom of either card. In FIG. 1, the left and right unprinted portions of the card are shown at 102 and 103, with the top and bottom unprinted portion above and below the columns being indicated at 104 and 105, corresponding numbers in the 200 series being employed in FIG. 2. More particularly, the "NC" reference characters in FIGS. 1 and 2 (the non-crosshatched single column or multi-column sections, examples of which are NC1–9 of FIG. 1 and NC29–30 of FIG. 2), may represent the ordinary uncoated and undyed manila surface of the card.

The color coding on these cards is coordinated with color coding used on the control-panel face and on the variable wiring 400W of the new control panel which replaces the wiring 300W of FIGS. 3 and 5. Examples of this color coding are clear primary colors with shades and tints, and also may include stripes of contrasting colors so long as any one color or striped combination is readily distinguishable from any and all other code colors and color combinations reasonably apt to be confused therewith, and the same considerations apply to the coordinated color coding used on the control panels.

The color coding applied to the cards of FIGS. 1 and 2 may represent either selectively dyed or stained regions of a card having a basic manila coloration, or it may for example represent thin colored sheets or strips of basically transparent, or translucent, but color-tinted plastic suitably bonded or otherwise applied to the appropriate regions on the face of the card, while the color coding employed on the wires such as 400W (when used, as is preferred) may represent a similar tinted plastic or other insulating material applied directly to the copper wires 400W, or (as preferred) may comprise wires insulated in the usual manner with insulating material of greater than film thickness and opaquely colored. The one distinction between the card coloring and the wire coloring is that it is important in the card coloring to avoid the use of any material which will tend to gum up the punching apparatus and which will also permit the printed material on the surface of the card itself to be readily and clearly readable, in addition to being capable of receiving direct printing or marking to allow cards 100 and 200 to be used in all of the common and standardized situations.

In the control boards of FIGS. 3 and 4, the terminals to which wiring 300W and 400W is applied are labeled 320 and 420. Since the 80 columns of the card of FIG. 1 and FIG. 2 represents 800 crosspoints or the like, keeping in mind that each column contains 10 crosspoint locations 0 to 9, a complete control panel 300 or 400 must have a basic minimum of 800 respectively corresponding jacks, or other machine-wiring terminals at the back of the control panel if all card crosspoints (FIGS. 1 and 2) are to be accommodated. Additionally, wired or unwired spare fixed terminals are commonly considered necessary for the machine-wiring terminals of a control panel, thereby increasing the fixed terminal apparatus of the control panel from 800 toward a larger number, such as 820 or 840. Moreover, the control panels should have additional common (or hub) fixed terminals for the termination of corresponding common machine wires on the back of the panel, such as two to four common hub terminals for each of the 10 crosspoints of digit positions 0 to 9 in any one of the 80 columns of the card. The last noted additional fixed machine-wiring terminals accessible from the back of the control panel may total 20 if no more than one spare is deemed sufficient for the 10 basically required 0 to 9 machine wires, and may total 40 if three spares are considered advisable for each of the 10 common 0 to 9 horizontal rows of crosspoint locations on the card of FIG. 1 or FIG. 2. A grand total of 880 fixed front-side available, control-panel terminals may thus be required on either of the control panels shown in FIGS. 3 and 4. This grand total may thus comprise (1) 800 machine-wire posts or terminals for the individual vertical and horizontal crosspoint locations on the data cards, (2) 40 spare terminals for spare or added card crosspoints which are wired to the machine, and (3) the 40 noted common terminals for the common machine wires.

The common machine wires may be termed inlet wires when a card is being read and outlet wires when a card is being punched. The noted basic 800 wires, together with their related spare wires, may be termed individual wires in that they correspond respectively and individually to crosspoint locations on a punch card. Thus, unlike the 40 common wires, they do not necessarily need to be termed inlet or outlet wires. However, it should be noted that a pulse passing over a common wire is expected to traverse one (or several, according to coding), of the individual wires then under scrutiny for punching or reading purposes.

A theoretical maximum of 800 times a certain probability factor (having a value such as somewhere between 1 and 10) of connections through wires 300W or 400W may be required to carry pulses between any selected common-wire terminal and the noted individual-wire terminals. In practice, this maximum theoretical number may or may not be reached, depending upon the function or current use of the particular machine of which the control panel is a part, having a rather close relation to the maximum number of coding holes punched or to be punched into the cards illustrated in FIGS. 1 and 2. The wiring devices heretofore employed to effect this relatively large possibly required number of connections include the wiring devices 300W, 500W, and 1300W of FIGS. 3, 5, and 13. The apparatus heretofore used for applying the individual wires include plugs 500P and 1300P with a heavy wrap of insulation around the wires brought snug up against the ends of the plug or into the ends of the plug, with a reinforcing insulation (not shown) around the juncture of plug and wire to permit the plugs to be removed (as from jacks 500J) and inserted many times in normal operation before the wires pull loose from the plug or are broken. A result has been that the wires 300W have tended to break within the insulation where the break cannot be seen (as is common with lamp cords and the like), giving rise to relatively undetectable trouble conditions. Moreover, the plugs 500P have themselves been so far inserted into the control panel that test-clip apparatus practically cannot be used, necessitating removal of the plug for the hereinbefore noted testing operation. These wiring devices 300W have also included similarly constructed and connected loose splicing devices 300S and 500S which are themselves also open to the same hidden-defect objection. In FIG. 13 is indicated the looped or bent part of a wire 1300 which gives rise in a large measure to the tangled wiring condition shown at 300W.

On the control panel 400 of FIG. 4, the color strips 406 are employed (see also 606 to 1206) which aid the on-the-spot workman to keep track of the wiring on the front of a panel where the wires representing the grand total of 880 machine wires and their multiples are to be individually identifiable. The basic 800 of these terminal points correspond respectively to the 800 crosspoint locations on the cards of FIGS. 1 and 2. Since machine-size considerations ordinarily dictate that the length of a control panel 400 may not be greater than a certain maximum dimension, it is necessary that the terminals 320, 420 be divided into left and right groups, with (for example) columns 1 to 40 on the card to be accommodated by terminals on the left half of the control panel, while card columns 41 to 80 are accommodated by respectively corresponding terminals appearing on the right half of the control panel. It will be observed that the color coding strips 406, of which only the uppermost and the lowermost ones are illustrated in FIG. 4, comprise left and right strips separated along the longitudinal center line of the panel to permit the noted coordination of color coding between the improved control board and the improved data cards to be carried out in a practicable and logical manner. It will be understood, of course, that the strips 406 may occur separately for each of the horizontal rows of terminals shown on FIG. 4 as is indicated in FIGS. 6 to 12. Preferably these individual color coding strips 406 and 606 to 1206, while readily adherent when applied, are not permanently adherent, and are readily removable with a major portion of the wiring 400W and 600W to 1200W in place.

Referring particularly to FIG. 11, the five wires directly wire wrapped around the forwardly extended four-cornered portion of the uppermost wiring item 1100P are either (*a*) all of the same color to indicate that they are attached to the same common-wire hub, or are (*b*) the corresponding wires of the same (or a lower-positioned) individual-wire terminal. The wires are commonly of respective colors and lengths, and in any event may be precisely applied by wire wrapping to extend along straight-line or sharp-cornered paths to respectively desired individual-wire control-panel terminals as will be evident from an inspection of FIG. 4.

It will be observed that certain of the preferably rectangular exposed wire-wrapped posts are relatively short (⅜ inch) as in FIGS. 9 and 10 to take only two wrapped wire connections, while the corresponding three-wire terminals of FIG. 7 may be about 1/16 inch longer, with the five-wire four-cornered extensions of FIGS. 6 and 11 approximately ⅝ inch in length.

While I have described above the principles of my invention in connection with specific apparatus, it is to be clearly understood that this description is made only by way of example and not as a limitation to the scope of my invention.

I claim:

1. Apparatus for connecting a group of common pulse wires of a data processing machine with a succession of groups of individual pulse wires of the machine, the machine being adapted to employ punch cards each having colored stripes extending across it dividing the card into a series of distinctively colored zones, the apparatus consisting of an insulating terminal-post panel having a front side and a rear side, a series of colored stripes extending across the front of the panel dividing the panel into a series of distinctively colored zones corresponding respectively to the said colored zones of the said punch cards, rows of terminal posts extending across the panel and located in the said zones of the panel, each terminal post comprising a flat straight metal strip of a given width extending through the panel from the rear side to the front side and held firmly in place therein, each terminal post having a relatively short rear terminal portion of reduced width exposed outside of the panel and having a longer front terminal portion of reduced width exposed outside of the panel, common pulse wires connected to the rear terminal portions of the respective terminal posts of the first said row, groups of individual pulse wires connected to the rear terminal portions of the respective terminal posts of the succeeding said rows in a succession of groups coinciding with said zones of the panel, and local wires on the front of the panel having colors the same as those of the said zones and extending from post to post to connect the posts to which the common pulse wires are connected to desired ones of the posts to which individual wires are connected, certain of the local wires being direct wires each extending from a common-wire post directly to an individual-wire post, each direct local wire being wrapped tightly around the said front terminal portion of each last said post, being pulled taut between the last said posts, and being of the same color as the zone of the panel in which the said individual-wire one of the last said posts is located, the remaining local wires being extension wires each extending from a direct-wire-connected individual-wire post to a succeeding individual-wire post, each extension local wire being wrapped tightly around the said front terminal portion of each last said post, being pulled taut between the last said posts, and being of the same color as the zone of the panel in which is located the one of the last said posts to which the extension wire carries a connection from a common-wire terminal post.

2. Apparatus for connecting a group of common pulse wires of a data processing machine with a succession of groups of individual pulse wires of the machine, consisting of an insulating terminal-post panel having a front side and a rear side, a series of colored stripes extending across the front of the panel dividing the panel into a series of distinctively colored zones, rows of terminal posts extending across the panel and located in the said zones, each terminal post comprising a flat straight metal strip of given width extending through the panel from the rear side to the front side and held firmly in place therein, each terminal post having a relatively short rear terminal portion of reduced width exposed outside of the panel and having a longer front terminal portion of reduced width exposed outside of the panel, common pulse wires connected to the rear terminal portions of the terminal posts of the first said row, groups of individual pulse wires connected to the rear terminal portions of the terminal posts of the succeeding said rows in a succession of groups coinciding with said zones, and local wires on the front of the panel having colors the same as those of the said zones and extending from post to post to connect the posts to which the common pulse wires are connected to desired ones of the posts to which individual wires are connected, certain of the local wires being direct wires each extending from a common-wire post directly to an individual-wire post, each direct local wire being wrapped tightly around the said front terminal portion of each last said post, being pulled taut between the last said posts, and being of the same color as the zone in which the said individual-wire one of the last said posts is located, the remaining local wires being extension wires each extending from a direct-wire-connected individual-wire post to a succeeding individual-wire post, each extension local wire being wrapped tightly around the said front terminal portion of each last said post,
being pulled taut between the last said posts,
and being of the same color as the zone in which is located the one of the last said posts to which the extension wire carries a connection from a common-wire terminal post.

3. Apparatus for connecting a group of common pulse wires of a data processing machine with a succession of groups of individual pulse wires of the machine, consisting of an insulating terminal-post panel having a front side and a rear side,
a series of colored stripes extending across the front of the panel dividing the panel into a series of distinctively colored zones,
rows of terminal posts extending across the panel and located in the said zones,
each terminal post comprising a flat metal strip of a given width extending through the panel from the rear side to the front side and held firmly in place therein,
each terminal post having a rear terminal portion and having a front terminal portion exposed outside of the panel of a length sufficient to permit at least two wires to be connectively and separately wrapped therearound,
common pulse wires connected to the rear terminal portion of the terminal posts of the first said row,
groups of individual pulse wires connected to the rear terminal portions of the terminal posts of the succeeding said rows in a succession of groups coinciding with said zones,
and local wires on the front of the panel having colors the same as those of the said zones and extending from post to post to connect the posts to which the common pulse wires are connected to desired ones of the posts to which individual wires are connected,
certain of the local wires being direct wires each extending from a common-wire post directly to an individual-wire post,
each direct local wire being wrapped tightly around the said front terminal portion of each last said post,
being pulled taut between the last said posts,
and being of the same color as the zone in which the said individual-wire one of the last said posts is located,
the remaining local wires being extension wires each extending from a direct-wire-connected individual-wire post to a succeeding individual-wire post, each extension local wire being wrapped tightly around the said front terminal portion of each last said post,
being pulled taut between the last said posts,
and being of the same color as the zone in which is located the one of the last said posts to which the extension wire carries a connection from a common-wire terminal post.

4. A control-panel combination comprising a group of common machine-pulse wires respectively representing separate digit values,
a series of groups of individual machine-pulse wires respectively representing a series of numerical orders, with the wires of any group respectively representing said separate digit values,
a control panel having a fixed-attachment rear side and a variable attachment front side for the variable connection of the common machine-pulse wires to the individual machine pulse wires according to the machine function to be performed,
a group of common-wire terminal posts extending through the control panel from the rear side to the front side and assigned to the respective common machine-pulse wires,
a series of groups of individual-wire terminal posts extending through the control panel from the rear side to the front side and assigned in succession to the wires in the respective groups of individual machine-pulse wires,
each of said groups of terminal posts being disposed in a row extending crosswise of the control panel, with the rows of individual-wire terminal posts succeeding the row of common-wire terminal posts and succeeding each other in a direction lengthwise of the control panel,
wire-terminating means at the rear of the control panel for fixedly terminating each said machine-pulse wire on the rear portion of the terminal post to which it is assigned,
changeable local wires extending across the front of the control panel to effect variable connections from the common-wire terminal posts to a desired combination of the individual-wire terminal posts,
color striping means applied across the front of the control panel to code mark on the panel the respective numerical orders to which the said rows of individual terminal members correspond because of their termination of respective numerical orders of individual machine-pulse wires,
each of the said local wires being colored to accord with said color striping pertaining to the row of individual terminals to which it extends a connection,
changeable wire-terminating means at the front of the panel for connecting the ends of the said local wires changeably to respective ones of said terminal posts between which they extend,
the changeable-wire terminating means comprising a forward extension of each said terminal-post of uniform cross section and of sharp-cornered outline to facilitate making a wrap-around wire connection thereto, each said extension being of sufficient length to permit at least two of said local wires to be wrapped therearound in succession,
the said changeable wire-terminating means permitting each local wire to be attached when cut to length and pulled taut between the terminal post extensions to which it is to be attached,
whereby the local wires may be readily cut to length and applied to connect the common-wire terminal posts respectively to as many individual-wire terminal posts as may be required to accord with a machine function to be performed, and the specific terminal posts to which all connected local wires are connected may be readily checked and verified.

5. A control-panel combination comprising a group of common machine-pulse wires respectively representing separate digit values,
a series of groups of individual machine-pulse wires respectively representing a series of numerical orders, with the wires of any group respectively representing said separate digit values,
a control panel having a fixed-attachment rear side and a variable attachment front side for the variable connection of the common machine-pulse wires to the individual machine pulse wires according to the machine function to be performed,
a group of common-wire terminal posts extending through the control panel from the rear side to the front side and assigned to the respective common machine-pulse wires,
a series of groups of individual-wire terminal posts extending through the control panel from the rear side to the front side and assigned in succession to the wires in the respective groups of individual machine-pulse wires,
each of said groups of terminal posts being disposed in a row extending crosswise of the control panel, with the rows of individual-wire terminal posts succeeding the row of common-wire terminal posts and succeeding each other in a direction lengthwise of the control panel, wire-terminating means at the rear of the control panel for fixedly terminating each said machine-pulse wire on the rear portion of the terminal post to which it is assigned, changeable local wires extending across the front of the control panel to effect variable connections from the common-wire terminal posts to a desired combination of the individual-wire terminal posts, changeable wire-terminating means at the front of the panel for connecting the ends of the said local wires changeably to respective ones of said terminal posts between which they extend, the changeable-wire-terminating means comprising a forward extension of each said terminal-post of uniform cross section and of sharp-cornered outline to facilitate a wrap-around wire connection thereto, each said extension being of sufficient length to permit at least two of said local wires to be wrapped therearound in succession, certain of the local wires comprising a separate plurality of direct wires extending from each common-wire terminal post to respective individual-wire terminal posts, the remainder of said local wires comprising extension wires each extending from a separate one of the last said individual-wire terminal posts to another individual-wire terminal post located still further from the common-wire terminal posts, each said local wire being cut to length according to the distance between the terminal posts connected thereby and being wrapped at its respective ends around the said forward extensions of the last said terminal posts.

6. In combination a control-panel having a fixed-attachment rear side and a variable attachment front side, a group of common-wire terminal posts and a series of groups of individual-wire terminal posts extending through the control panel from the rear side to the front side, each of said groups of terminal posts being disposed in a row extending crosswise of the control panel, with the rows of individual-wire terminal posts succeeding the row of common-wire terminal posts and succeeding each other in a direction lengthwise of the control panel, wire-terminating means at the rear of the control panel for fixedly terminating a separate machine-pulse wire on the rear portion of each terminal post, local wires extending lengthwise across the front of the control panel from the common-wire terminal posts to respective selected ones and combinations of the local-wire terminal posts, local-wire-terminating means comprising a forward extension of each said terminal post of uniform cross section and of sharp-cornered outline to facilitate a wrap-around local-wire connection thereto, each extension being sufficient length to permit connectively attaching the end of a said local wire thereto by wrapping and to thereafter permit a similar connective attachment of at least one other local wire to be made thereto by wrapping while the first local wire remains attached thereto, the said terminal-post extensions permitting each local wire to be attached when cut to length and pulled generally taut between the terminal post extensions to which it is attached, each common-wire terminal post having more than two of said local wires attached to its said forward extensions, certain ones of the individual-wire terminal posts each having at least two of said local wires attached to its said forward extension, certain other ones of the individual-wire terminal posts each having a single one of said local wires attached to its said forward extension, and the remaining ones of said individual-wire terminal posts having none of said local wires attached to their said forward extensions.

References Cited in the file of this patent

UNITED STATES PATENTS

| | | |
|---|---|---|
| 860,861 | Flory | July 23, 1907 |
| 1,041,473 | Hogan | Oct. 15, 1912 |
| 2,253,136 | Richter | Aug. 19, 1941 |
| 2,707,274 | Kough | Apr. 26, 1955 |